United States Patent [19]

Yamashita

[11] 4,003,289
[45] Jan. 18, 1977

[54] GILL NET

[75] Inventor: Shigeru Yamashita, Okayama, Japan

[73] Assignee: Morishita Fishing Net Manufacturing Co., Ltd., Okayama, Japan

[22] Filed: Sept. 30, 1975

[21] Appl. No.: 618,145

[30] Foreign Application Priority Data

Oct. 4, 1974 Japan.................49-120566

[52] U.S. Cl. .................. 87/12; 43/10
[51] Int. Cl.² .............. A01K 69/02; D04G 1/00
[58] Field of Search .......... 87/12; 57/140 R; 43/7, 43/9–12, 14

[56] References Cited

UNITED STATES PATENTS

| 3,039,348 | 6/1962 | Grabowsky | 87/12 |
| 3,129,632 | 4/1964 | Starr | 87/12 |
| 3,329,061 | 7/1967 | Momoi | 87/12 |
| 3,793,822 | 2/1974 | Kawai | 87/12 X |

Primary Examiner—John Petrakes
Attorney, Agent, or Firm—Howson and Howson

[57] ABSTRACT

A gill-net comprising warps and wefts of which diameter is smaller than that of the warp. The gill-net is knotted with the warp and weft by double English knotting.

1 Claim, 3 Drawing Figures

GILL NET

The present invention relates to a gill-net.

In the fishing operation with the gill-net, the fish thrusts itself into the mesh of the net and is caught at the gill. Therefore, in order to increase exploitation rate, it is desirable to form the gill-net with twines of low visibility. Further it has been known that the gill-net made of fine twine may increase the exploitation rate. However, the gill-net made of fine twine has a tendency to be broken by the fish which tries to escape from the net by expanding the mesh and or broken when the thrusted fish is removed from the mesh by fisherman. Therefore, excessively fine twine should not be employed in manufacturing the gill-net.

Further, if a knot of the net is slipped by the violent moving of the thrusted fish, the mesh adjacent the knot is expanded, which results in escape of the fish. Accordingly, it is important to form such a net that knots of the nets may not be slipped by fish. If the gill-net is formed by the double English knotting, the knots can not be moved. However, the double English knot is larger than the single English knot. Accordingly, the double English knot can be readily distinguished as the knot of the net by the fish which is therefore not suited for the gill-net. There has not been provided a gill-net which has above described characteristics of low visibility, high tensile strength and strong tightness of knot.

The inventor of the present invention conducted an experiment of mesh breaking strength of the gill-net of which warp and weft are equal in diameter and knotted in the double English knot. As a result, it has been found that the weft is not broken but the warp is broken in 80 to 90% of the tested gill-nets. Further it has been observed that even if a weft having smaller weight than a warp is used, tightness of the knot is not affected.

Thus, the object of the present invention is to provide a gill-net which is knotted with a finer weft than a warp by double English knotting whereby the gill-net having a low visibility, high tensile strength and strong tightness of knots may be obtained.

Figure 1:
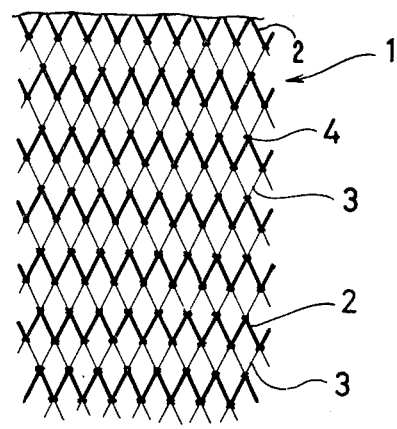
FIG. 1 shows a gill-net according to the present invention.
Figure 2:
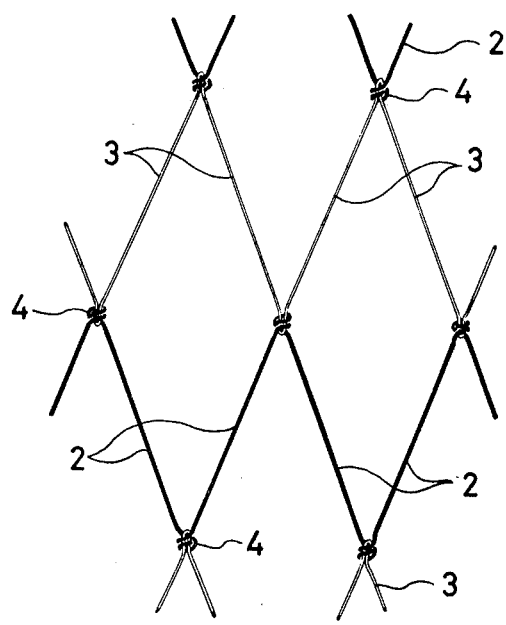
FIG. 2 is an enlarged illustration of a part of the gill-net in FIG. 1.
Figure 3:
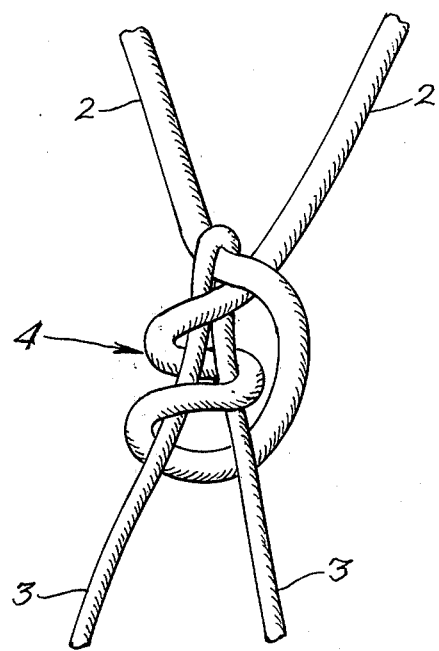
FIG. 3 is an enlarged view of the double-English knot used in the net of FIG. 1 and FIG. 2.

Referring to the drawings, a gill-net 1 according to the present invention comprises warps 2 and wefts 3 having a smaller weight than the warp 2 and is knotted by the double English knotting 4.

EXAMPLE 1

As one example of the present invention, a gill-net was formed with a warp of 210$d$/8 ply nylon monofilament and a weft of 210$d$/7 ply nylon monofilament by the double English knotting. Further a conventional gill-net which is knotted with a warp of 210$d$/8 ply nylon monofilament and a weft of 210$d$/8 ply nylon monofilament by the double English knotting was prepared. The mesh breaking strength test of the both gill-nets was carried out. Results of the test are as following table.

Table 1

| Test number | The conventional gill-net | | The gill-net of the present invention | |
|---|---|---|---|---|
| | Test load (Kg) | Result | Test load (Kg) | Result |
| 1 | 14.2 | warp broken | 14.7 | weft broken |
| 2 | 13.8 | '' | 15.3 | warp broken |
| 3 | 15.2 | weft broken | 14.2 | weft broken |
| 4 | 14.7 | warp broken | 14.6 | '' |
| 5 | 15.6 | '' | 14.9 | warp broken |
| 6 | 15.1 | '' | 15.3 | '' |
| 7 | 14.8 | '' | 13.9 | weft broken |
| 8 | 14.3 | '' | 15.1 | warp broken |
| 9 | 15.2 | warp broken | 13.8 | weft broken |
| 10 | 15.3 | '' | 14.7 | '' |
| Average | 14.82 | 90% are broken at warp | 14.65 | 40% are broken at warp |

EXAMPLE 2

An example gill-net was formed with a warp of 210$d$/10 ply nylon monofilament and a weft of 210$d$/9 ply nylon monofilament and conventional one was formed with a nylon monofilament of 210$d$/10 each of which is knotted by the double English knotting. The mesh breaking strength test is as follows.

Table 2

| Test number | The conventional gill-net | | The gill-net of the present invention | |
|---|---|---|---|---|
| | Test load (Kg) | Result | Test load (Kg) | Result |
| 1 | 39.2 | warp broken | 40.2 | warp broken |
| 2 | 40.4 | '' | 39.6 | weft broken |
| 3 | 41.2 | '' | 39.0 | '' |
| 4 | 40.6 | '' | 38.7 | warp broken |
| 5 | 39.8 | '' | 40.6 | '' |
| 6 | 41.1 | '' | 39.8 | weft broken |
| 7 | 38.8 | '' | 39.5 | warp broken |
| 8 | 40.6 | '' | 40.3 | '' |
| 9 | 39.7 | '' | 38.9 | weft broken |
| 10 | 39.5 | '' | 39.5 | '' |
| Average | 40.09 | 100% are broken at warp | 39.56 | 50% are broken at warp |

From the foregoing it will be understood that the present invention provides a gill-net formed with a finer weft than a warp thereby the double English knot may be formed in small size. Thus, the present invention may provide a gill-net which has a low visibility, high tensile strength and strong tightness of the knot.

What is claimed is:

1. A gill net comprising monofilament zigzag wefts alternating with monofilament zigzag warps, the vertices of the zigzags of said warps forming knots with the adjacent vertices of the zigzags of said wefts, said knots being double English knots and the monofilament of said wefts being of substantially smaller diameter than the monofilaments of said warps.

* * * * *